United States Patent
Yoshioka et al.

(10) Patent No.: US 8,070,215 B2
(45) Date of Patent: Dec. 6, 2011

(54) VEHICLE IMPACT DETECTION SYSTEM

(75) Inventors: Hideki Yoshioka, Anjo (JP); Toshimasa Okamoto, Okazaki (JP); Takashi Yakata, Toyoake (JP); Tomohiro Inagaki, Kariya (JP); Naomi Sugano, Okazaki (JP)

(73) Assignee: Mitsubishi Jidosha Kogyo Kabushiki Kaisha, Tokyo (JP)

(*) Notice: Subject to any disclaimer, the term of this patent is extended or adjusted under 35 U.S.C. 154(b) by 12 days.

(21) Appl. No.: 12/719,593

(22) Filed: Mar. 8, 2010

(65) Prior Publication Data

US 2010/0231002 A1    Sep. 16, 2010

(30) Foreign Application Priority Data

Mar. 10, 2009  (JP) .................................. 2009-056553

(51) Int. Cl.
*B60R 21/00* (2006.01)
(52) U.S. Cl. .............. 296/187.12; 296/193.07; 296/204; 296/209
(58) Field of Classification Search ............. 296/187.03, 296/187.12, 193.05, 203.01, 203.03, 209, 296/193.07, 204
See application file for complete search history.

(56) References Cited

U.S. PATENT DOCUMENTS

| 6,409,257 B1* | 6/2002 | Takashina et al. ............ 296/209 |
| 2005/0082876 A1* | 4/2005 | Akasaka ................... 296/203.01 |
| 2008/0319614 A1* | 12/2008 | Kuhn et al. ...................... 701/45 |

FOREIGN PATENT DOCUMENTS

JP    2008-254702 A    10/2008

* cited by examiner

*Primary Examiner* — Dennis H. Pedder
*Assistant Examiner* — Jason S Daniels
(74) *Attorney, Agent, or Firm* — Birch, Stewart, Kolasch & Birch, LLP

(57) ABSTRACT

A side sill beam having a shape of an arch concave outwards in a vehicle-width direction is placed in a side sill, and includes first and second ends welded to joining areas with front and rear floor cross members, respectively. A first impact detection element that detects an impact from the outside in the vehicle-width direction is disposed near the joining areas of the side sill and the front or rear floor cross member, and a second impact detection element that detects an impact from the outside in the vehicle-width direction is disposed offset from the first impact detection element in a vehicle front-rear direction as viewed in the vehicle-width direction.

8 Claims, 8 Drawing Sheets

VEHICLE IMPACT DETECTION SYSTEM

BACKGROUND OF THE INVENTION

1. Field of the Invention

The invention relates to a vehicle impact detection system, and more specifically, to a system for transmitting an impact to the side of a vehicle body.

2. Description of the Related Art

Vehicle occupant protection devices that have been used include a curtain airbag and a side airbag that detect an impact in the event of a side impact crash and then deploy between an occupant and the vehicle body.

The curtain airbag, the side airbag and the like are actuated in response to a command from an airbag ECU after load (deceleration) caused in the event of a side impact crash was detected by two impact sensors located in the side part of the vehicle body and in the center in the vehicle-width direction, and the impact was sensed by the airbag ECU.

Concerning an occupant protection device like the one mentioned above, however, the curtain and side airbags and the like might fail to be actuated even if the load is inputted from the outside in the vehicle-width direction in the event of a side impact crash (especially a collision with a pole). This is because an impact area is locally deformed due to small contact area between the impacted object (pole) and the vehicle body, and this local deformation of the impact area consumes impact energy, resulting in a failure to accurately transmit impact load to the impact sensors.

Given the above facts, a technology has been developed, in which a load-transmitting member is installed in an air dam (rocker molding), and the load inputted from the outside in the vehicle-width direction into the air dam in the even of a side impact crash is transmitted to impact sensors (Unexamined Japanese Patent Publication No. 2008-254702).

According to the publication, the load-transmitting member is fixed with a foam material in the air dam, and the load produced in the event of a side impact crash is transmitted from the load-transmitting member through a side sill to the impact sensor located in the side part of the vehicle body.

However, the transmission of the impact load to the impact sensor located in the center in the vehicle-width direction fails to be carried out as impact energy is consumed because of deformation in the side sill or the like. There is a possibility that an impact is not detected with proper timing by the impact sensor located in the center, and then that airbag deployment is delayed. This is an unfavorable situation.

SUMMARY OF THE INVENTION

The present invention has been made to solve the above-mentioned problem. It is an object of the invention to provide a vehicle impact detection system capable of accurately transmitting load produced in the event of a side impact crash to impact sensors located in a side part of a vehicle body and in the center in a vehicle-width direction.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Embodiments of the invention will be described below with reference to the attached drawings.

A first embodiment will be described first.

Figure 1:
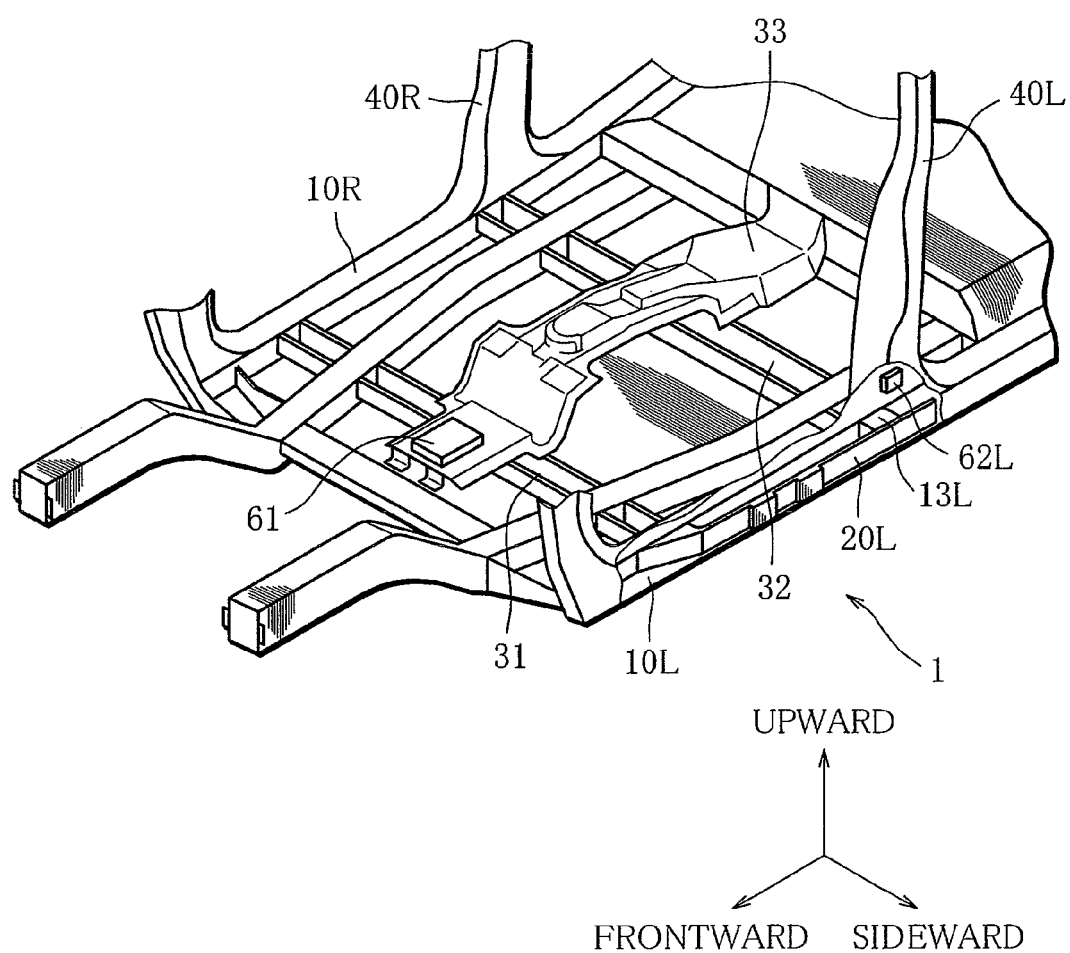
FIG. 1 is a schematic configuration view of a vehicle impact detection system according to a first embodiment of the invention.
Figure 2:
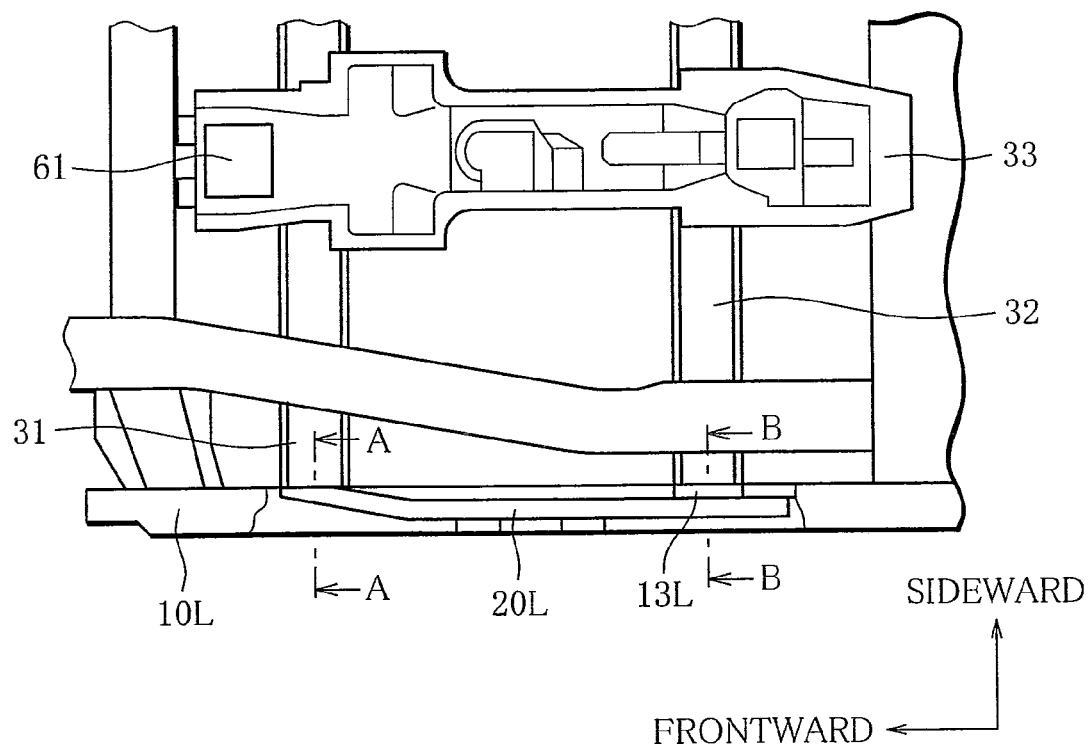
FIG. 2 is a top view of the vehicle impact detection system according to the first embodiment of the invention.
Figure 3:
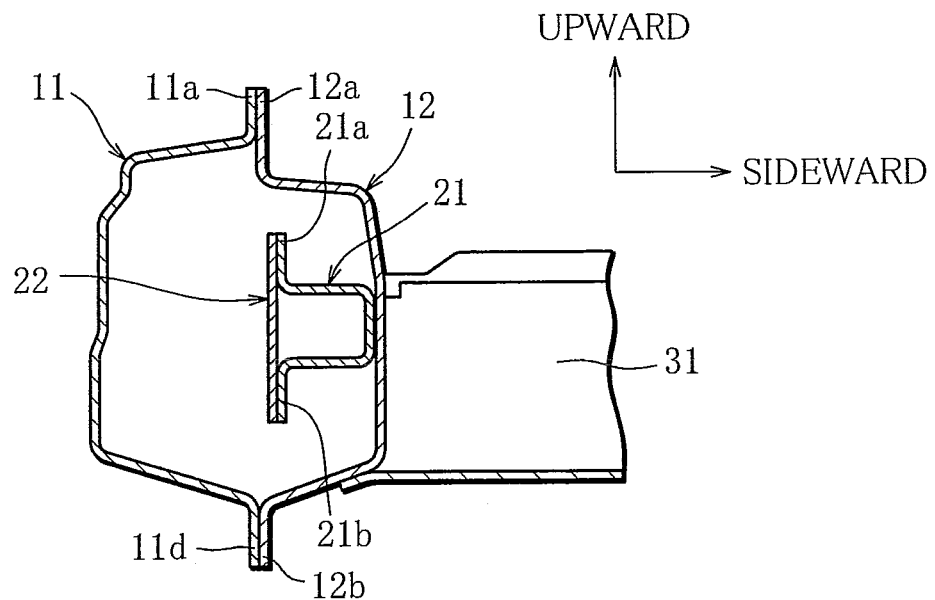
FIG. 3 is a cross-section across line A-A of FIG. 2 according to the first embodiment of the invention.
Figure 4:
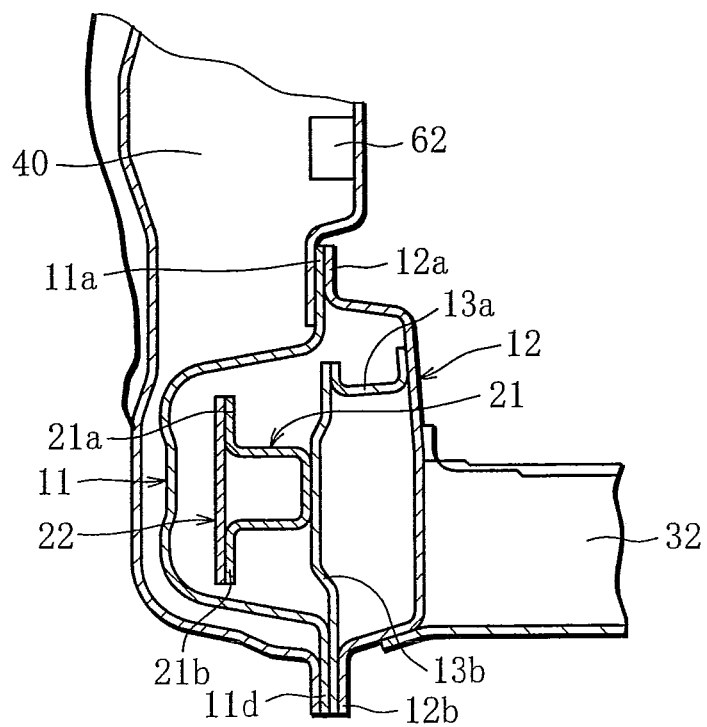
FIG. 4 is a cross-section across line B-B of FIG. 2 according to the first embodiment of the invention.

FIG. 1 is a schematic configuration view of a vehicle impact detection system according to the first embodiment of the invention. FIG. 2 is a top view of the vehicle impact detection system. FIG. 3 is a cross-section across line A-A, and FIG. 4 across line B-B. FIGS. 3 and 4 are detailed views of the vehicle impact detection system according to the invention.

In the drawings, arrows "FORWARD" and "UPWARD" indicate forward and upward directions, respectively, of the vehicle body. An arrow "SIDEWARD" indicates an inward direction of a vehicle-width direction. Reference marks R and L in the drawings mean right and left, respectively. FIGS. 3 and 4, however, omit these reference marks R and L.

The configuration of the vehicle impact detection system will be described below.

As shown in FIGS. 1 to 4, a vehicle referred to in the present embodiment is of a monocoque construction.

Side sills 10R and 10L are framework members arranged under right and left side parts of a vehicle body 1 and extending in a vehicle front-rear direction. The side sills 10R and 10L include side sill outers 11R and 11L, and side sill inners 12R and 12L, respectively, each having a hat-like sectional shape as viewed in the vehicle front-rear direction. The side sill outers 11R and 11L open inwards in the vehicle-width direction as viewed in the vehicle front-rear direction. The side sill inners 12R and 12L open outwards in the vehicle-width direction. Upper flanges 11aR and 11aL of the side sill outers 11R and 11L are welded to upper flanges 12aR and 12aL of the side sill inners 12R and 12L, respectively. Lower flanges 11dR and 11dL of the side sill outers 11R and 11L are welded to lower flanges 12bR and 12bL of the side sill inners 12R and 12L, respectively. The side sills 10R and 10L are thus formed in a closed cross section structure.

The side sill inners 12R and 12L of the side sills 10R and 10L are welded to both ends of a front floor cross member (first cross member) 31 in substantially front sections of the side sills 10R and 10L in the vehicle front-rear direction, the front floor cross member 31 extending between the substantially front sections of the side sills 10R and 10L in the vehicle-width direction. At the same time, the side sill inners 12R and 12L are also welded to both ends of a rear floor cross member (second cross member) 32 in substantially central sections of the side sills 10R and 10L in the vehicle front-rear direction, the rear floor cross member 32 extending between the substantially central sections in the vehicle-width direction as with the front floor cross member 31. In short, the right and left side sills 10R and 10L are formed in an integral construction, with the front and rear floor cross members 31 and 32 intervening therebetween.

Welded to the substantially central sections of the side sills 10R and 10L in the vehicle front-rear direction are lower ends of center pillars 40R and 40L extending in a vehicle top-bottom direction and each having a closed cross section structure as viewed in the vehicle top-bottom direction.

Bulk heads 13R and 13L made up with bulk-head upper walls 13aR and 13aL and vertical walls 13bR and 13bL are fixed to joining areas with the side sills 10R and 10L, to which the rear floor cross member 32 is welded, with the side sill inners 12R and 12L intervening therebetween. The drawings do not show the bulk head 13R, but show the bulk head 13L representing the both. To be specific, the bulk heads 13R and 13L are formed integrally with each other by welding first sides of the bulk-head upper walls 13aR and 13aL to first sides of the vertical walls 13bR and 13bL. Second sides of the bulk-head upper walls 13aR and 13aL are welded to closed-sectional inner walls of the side sills 10R and 10L of the side sill inners 12R and 12L at the joining areas of the rear floor cross member 32. Second sides of the vertical walls 13bR and 13bL are sandwiched between the lower flanges 11dR and 11dL and the lower flanges 12bR and 12bL, respectively, and welded together.

Welded to substantially central sections of the front and rear floor cross members 31 and 32 in the vehicle-width direction is a floor tunnel 33 extending in the vehicle front-rear direction and having a cross section structure in which a lower side of the floor tunnel 33 in the vehicle top-bottom direction is open as viewed in the vehicle front-rear direction.

Side sill beams (load-transmitting members) 20R and 20L are installed in the inside of the closed sections of the side sills 10R and 10L. The drawings do not show the side sill beam 20R, but show the side sill beam 20L representing the both. First ends of the side sill beams 20R and 20L are welded to the walls of the side sill inners 12R and 12L to be positioned in the joining areas of the front floor cross member 31, and second ends thereof are welded to the bulk-head vertical walls 13bR and 13bL of the bulk heads 13R and 13L. In other words, the second ends of the side sill beams 20R and 20L are welded to the side sill inners 12R and 12L and the rear floor cross member 32 through the bulk heads 13R and 13L.

The side sill beams 20R and 20L are made up of side sill beam inners 21R and 21L each having a hat-like cross-section as viewed in the vehicle front-rear direction and plate-like side sill beam outers 22R and 22L located outside in the vehicle-width direction as shown in FIGS. 3 and 4. More specifically, upper flanges 21aR and 21aL and lower flanges 21bR and 21bL of the side sill beam inners 21R and 21L are welded to the side sill beam outers 22R and 22L, and thus, the side sill beams 20R and 20L have a closed cross-section structure in a shape like an arch that is concave outwards in the vehicle-width direction.

Satellite sensors (first impact detection element) 62R and 62L are disposed above the welded spots of the side sills 10R and 10L inside the cross-sections of the center pillars 40R and 40L. The drawings do not show the satellite sensor 62R, but show the satellite sensor 62L representing the both. The satellite sensors 62R and 62L are designed to detect load (deceleration) caused in the event of a side impact crash of the vehicle.

An airbag ECU 61 is installed in a substantially front section of an upper part of the floor tunnel 33. The airbag ECU 61 is a controller that controls an airbag, not shown. The airbag ECU 61 includes an input/output device, storage devices (ROM, RAM, nonvolatile RAM, etc.), a central processing unit (CPU), etc., and also includes an impact sensor that detects the load caused in the event of a side impact crash of the vehicle (second impact detection element).

The satellite sensors 62R and 62L are connected to an input side of the airbag ECU 61. Likewise, an impact sensor built into the airbag ECU 61 is also internally connected to the input side of the airbag ECU 61. Detected information is inputted through these sensors. Connected to an output side of the airbag ECU 61 are airbags, such as curtain and side airbags, not shown. In this condition, the airbag ECU 61 interprets a condition of the vehicle on the basis of detection signals transmitted from the various sensors. According to the vehicle condition, the airbag ECU 61 outputs actuation signals to the airbags, to thereby control the airbags.

The following description is about operation and effects of the vehicle impact detection system according to the first embodiment of the invention, which is configured as described above.

As shown in FIG. 2, since the side sill beams 20R and 20L are formed in a closed cross section structure having a shape of an arch that is concave outwards in the vehicle-width direction, the side sill beams 20R and 20L have sufficiently high strength and rigidity. In the event of a side impact crash from the outside in the vehicle-width direction, the side sill beams 20R and 20L are not immediately crushed. Impact load is transmitted to the center pillars 40R and 40L, and is also transmitted to the front floor cross member 31 and the rear floor cross member 32 joined to the front and rear ends of the side sill beams 20R and 20L. The impact load transmitted to the center pillars 40R and 40L is detected by the satellite sensors 62R and 62L. The impact load transmitted to the front floor cross member 31 and the rear floor cross member 32 is transmitted to the floor tunnel 33 joined to the width-directional central sections of the front and rear floor cross members 31 and 32, and is then detected by the impact sensor located in the airbag ECU 61.

The airbag ECU 61 interprets the vehicle condition, or judges whether or not there is a side impact crash, on the basis of the detection signals detected by the satellite sensors 62R and 62L and the detection signals detected by the impact sensor located in the airbag ECU 61. According to this judgment, the curtain and side airbags and the like are actuated.

As described above, according to the vehicle impact detection system of the first embodiment of the invention, in the event of a side impact crash of the vehicle, impact energy is not consumed because of a local deformation in an impact area. The impact load can be early and accurately transmitted with proper timing to the satellite sensors 62R and 62L and the impact sensor located in the airbag ECU 61. It is then possible to immediately deploy the airbags with proper timing before the deformation of the vehicle body progresses, and occupants are thus protected.

Since the side sill beams 20R and 20L each have a shape of an arch that is concave outwards in the vehicle-width direction, the impact load can be reliably transmitted to the front floor cross member 31 and the rear floor cross member 32, regardless of where in the side sill beams 20R and 20L is impacted. For example, even if the vehicle hits an object, such as a pole, on the front or rear section of the side sill beam 20R or 20L, the impact load can be reliably transmitted to the front floor cross member 31 and the rear floor cross member 32 as in a crash against the center of the side sill beam 20R or 20L.

A second embodiment will be described below.

Figure 5:
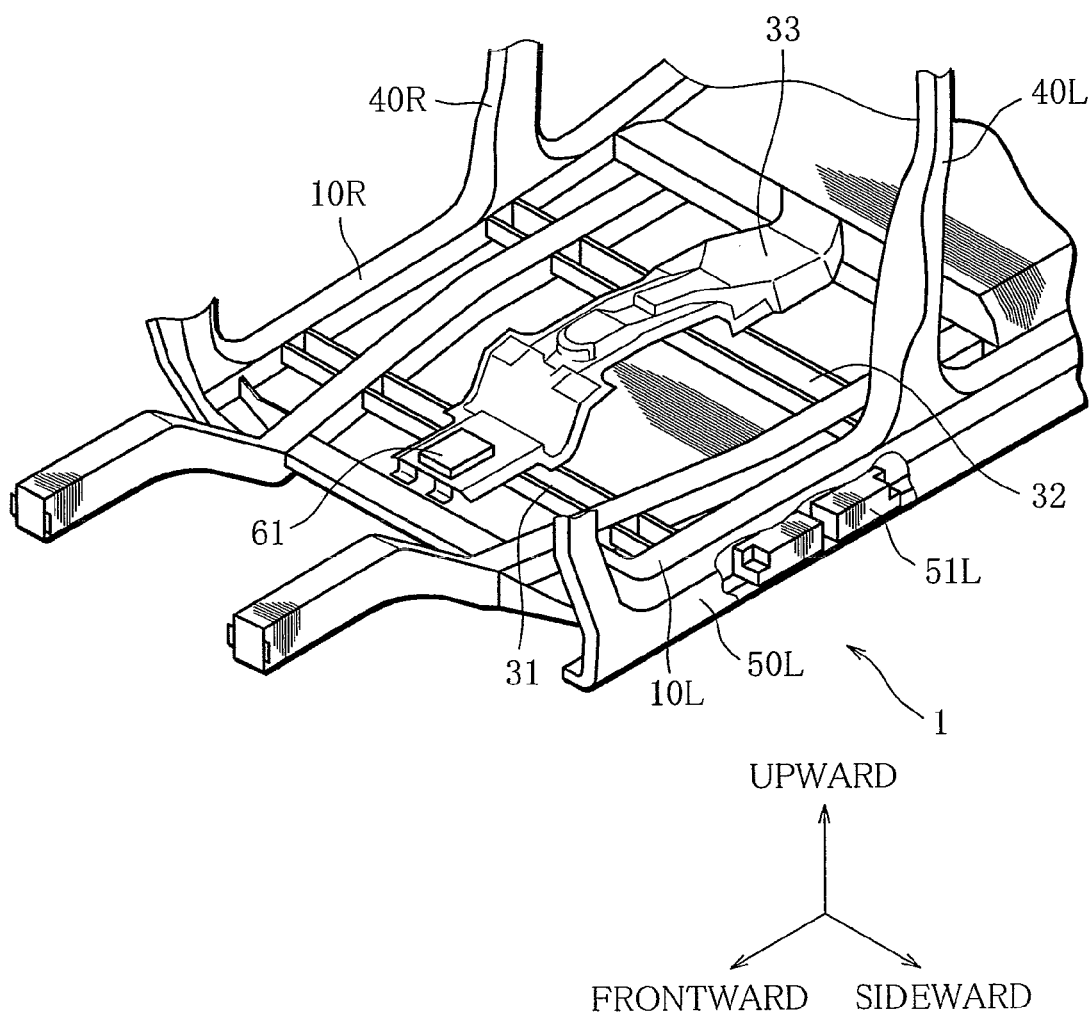
FIG. 5 is a schematic configuration view of a vehicle impact detection system according to a second embodiment of the invention.
Figure 6:
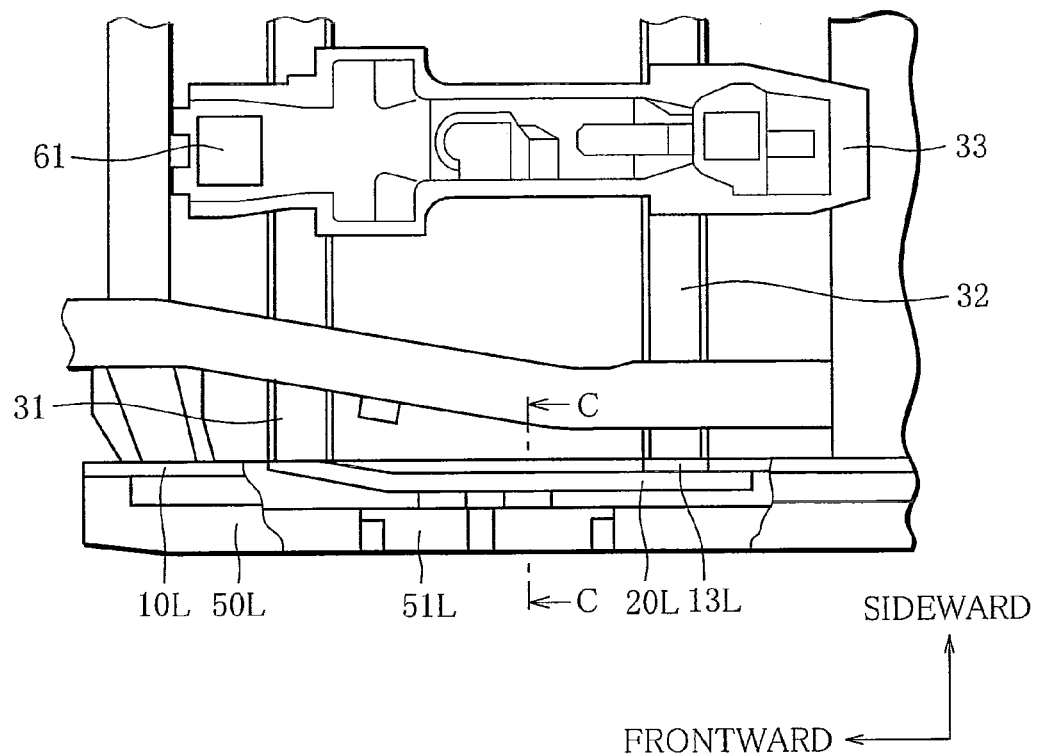
FIG. 6 is a top view of the vehicle impact detection system according to the second embodiment of the invention.
Figure 7:
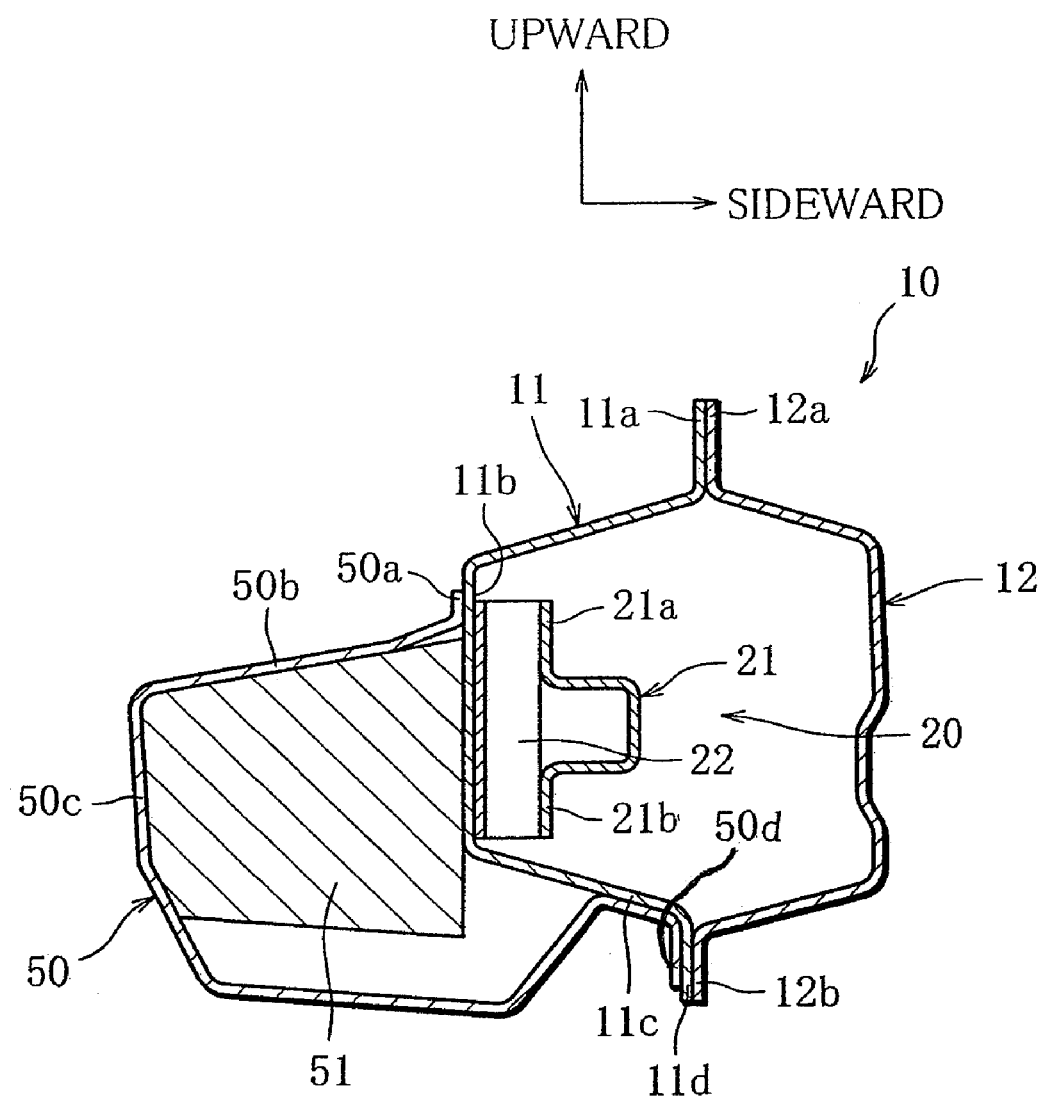
FIG. 7 is a cross-section across line C-C of FIG. 6 according to the second embodiment of the invention.

FIG. 5 is a schematic configuration view of a vehicle impact detection system according to the second embodiment of the invention. FIG. 6 is a top view of the vehicle impact detection system. FIG. 7 is a cross-section across line C-C, and is a detailed view of the vehicle impact detection system according to the invention. In FIG. 7, reference marks R and L are omitted.

The second embodiment differs from the first in that air dams 50R and 50L are added to the first embodiment. The following description explains different points from the first embodiment.

As shown in FIGS. 5 to 7, the resin air dams 50R and 50L extending in the vehicle front-rear direction are fixed to outer sides of the side sills 10R and 10L in the vehicle-width direction. The drawings do not show the air dam 50R, but show the air dam 50L representing the both. The air dams 50R and 50L each have a cross section structure that is open inwards in the vehicle-width direction as viewed in the vehicle front-rear direction, and are each formed in a shell structure including an internal space.

Upper flanges 50aR and 50aL formed on upper sides of open ends of the air dams 50R and 50L are fixed to upper parts of walls 11bR and 11bL of the side sill outers 11R and 11L, which are located on outer sides in the vehicle-width direction, by using a plurality of clips, not shown. Lower flanges 50dR and 50dL formed on lower sides of the open ends of the air dams 50R and 50L are fixed to lower parts of walls 11cR and 11cL of the side sill outers 11R and 11L, which are located on lower sides in the vehicle-width direction, by using a plurality of clips, not shown. Foam materials 51R and 51L are disposed in the internal spaces of the air dams 50R and 50L, respectively. The drawings do not show the foam material 51R, but show the foam material 51L representing the both.

The foam materials 51R and 51L are so arranged as to contact inner surfaces of the upper walls 50bR and 50bL located on upper sides of the air dams 50R and 50L in the vehicle front-rear direction, inner surfaces of the walls 50cR and 50cL located on outer sides of the air dams 50R and 50L in the vehicle-width direction (inner surfaces of the side walls), and outer surfaces of the walls 11cR and 11L located on the outer sides of the side sill outers 11bR and 11bL in the vehicle-width direction (outer surfaces of the side walls). The foam materials 51R and 51L are so arranged as to fit the arch-shaped portions of the side sill beams 20R and 20L at positions in the vehicle front-rear direction.

The following description is about operation and effects of the vehicle impact detection system according to the second embodiment of the invention, which is configured as described above.

As shown in FIG. 6, the side sills 10R and 10L are expanded outwards in the vehicle-width direction by providing the air dams 50R and 50L, and the foam materials 51R and 51L are disposed between the air dams 50R and 50L and the side sills 10R and 10L, respectively. Consequently, in the event of a side impact crash from the outside in the vehicle-width direction, the air dams 50R and 50L contact the impacted object, such as a pole, earlier than a door and the like or without much delay (within a short duration of delay). As a result, the impact load (deceleration) is transmitted from the air dams 50R and 50L to the side sills 10R and 10L.

As described above, in the vehicle impact detection system according to the second embodiment of the invention, due to the air dams 50R and 50L, the impact load from the outside in the vehicle-width direction can be promptly transmitted to the side sills 10R and 10L before the door is pushed into the vehicle interior. Consequently, the same effect is obtained as in the first embodiment.

Although the foam materials 51R and 51L are used in the present embodiment, there is no limitation, and foam cores may be utilized instead.

The effect is heightened by setting the arch-shaped portions in an area where a danger to an occupant is expected to be high or where the occupant is seated.

The invention is a vehicle impact detection system having a pair of right and left side sills that form a closed cross section structure, extend in a vehicle front-rear direction, and are arranged parallel with a lower side part of a vehicle body; a first cross member whose ends are joined to inner surfaces of the side sills in a vehicle-width direction; a second cross member that is arranged behind the first cross member in the vehicle front-rear direction and whose ends are joined to inner surfaces of the side sills in the vehicle-width direction; a floor tunnel extending in the vehicle front-rear direction and joined to the first and second cross members in a substantially central section in the vehicle-width direction; a load-transmitting member that has a shape like an arch curved outwards in the vehicle width direction, is installed in each of the side sills, and is joined to the corresponding side sill from the inside of the side sill at positions corresponding to joining areas with the side sill and the first and second cross members; a first impact detection element that is disposed near the joining areas with the side sill and the first and second cross members, and detects an impact from the outside in the vehicle-width direction; and a second impact detection element that is disposed in the floor tunnel to be offset from the first impact detection element in the vehicle front-rear direction, and detects an impact from the outside in the vehicle-width direction.

Since the load-transmitting member is set in the corresponding side sill and joined to the side sill from the inside of the side sill at the positions corresponding to the joining areas with the side sill and the first and second cross members, the load-transmitting member makes it possible to transmit load (deceleration) caused in the event of an side impact crash directly to both the cross members, and to transmit the impact load with proper timing to the first impact detection element and the second impact detection element that is placed in the center in the vehicle-width direction.

Since the load-transmitting member has the shape of an arch curved outwards in the vehicle-width direction, the impact load is reliably transmitted to the second impact detection element, regardless of where in the load-transmitting member is impacted.

This is the end of the description of the embodiments of the invention. However, aspects of the invention are not limited to these embodiments.

Figure 8:
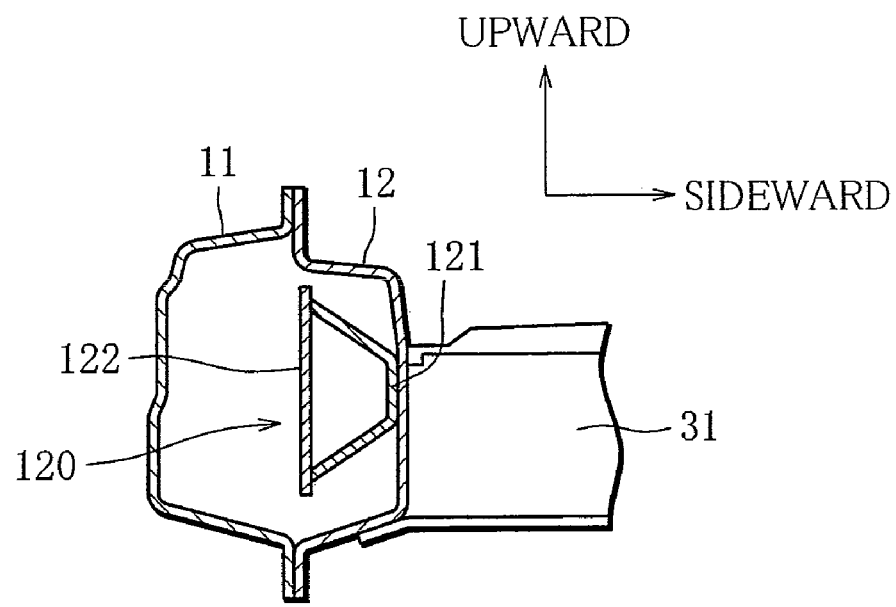
FIG. 8 is a cross-section of a side sill beam across line A-A of FIG. 2 according to another aspect of the invention.
Figure 9:
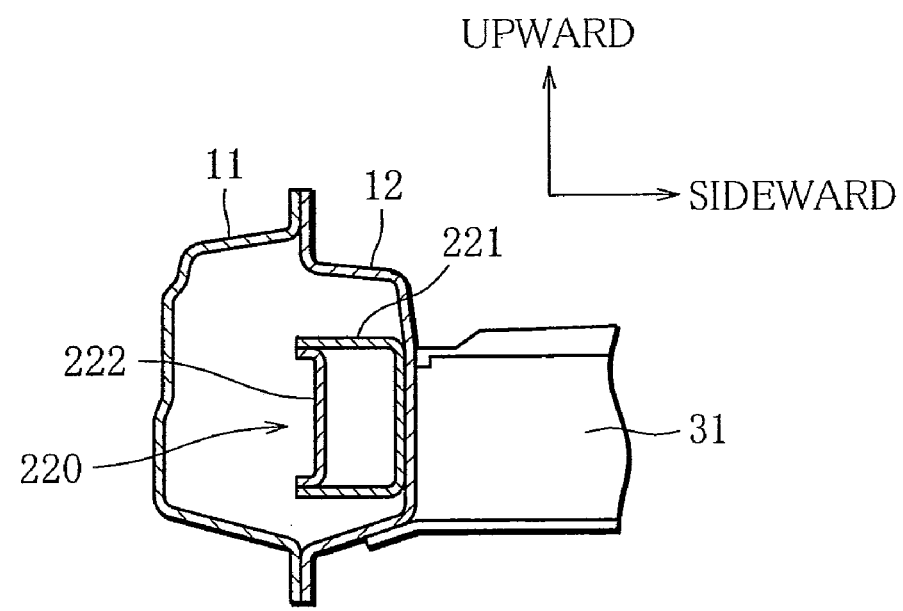
FIG. 9 is a cross-section of a side sill beam across line A-A of FIG. 2 according to another aspect of the invention.
Figure 10:
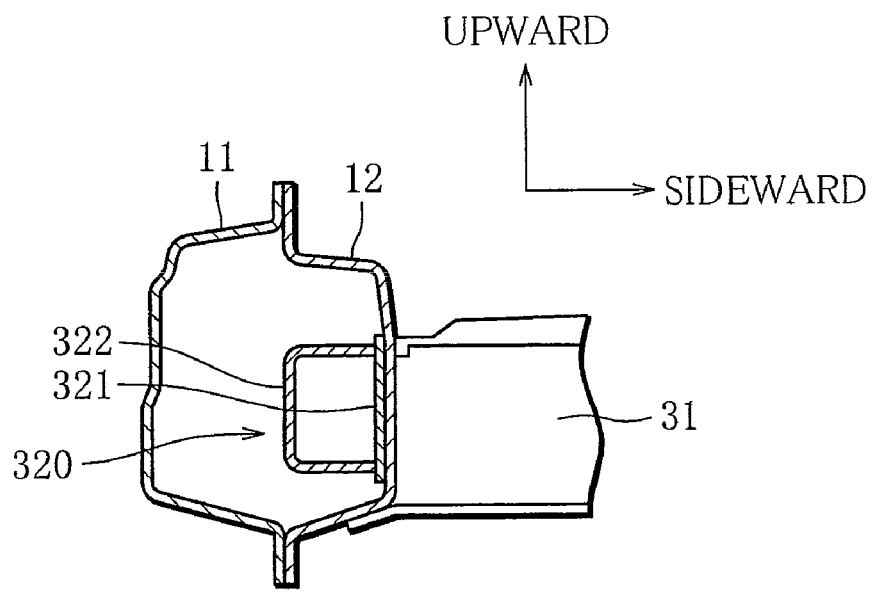
FIG. 10 is a cross-section of a side sill beam across line A-A of FIG. 2 according to another aspect of the invention.
Figure 11:
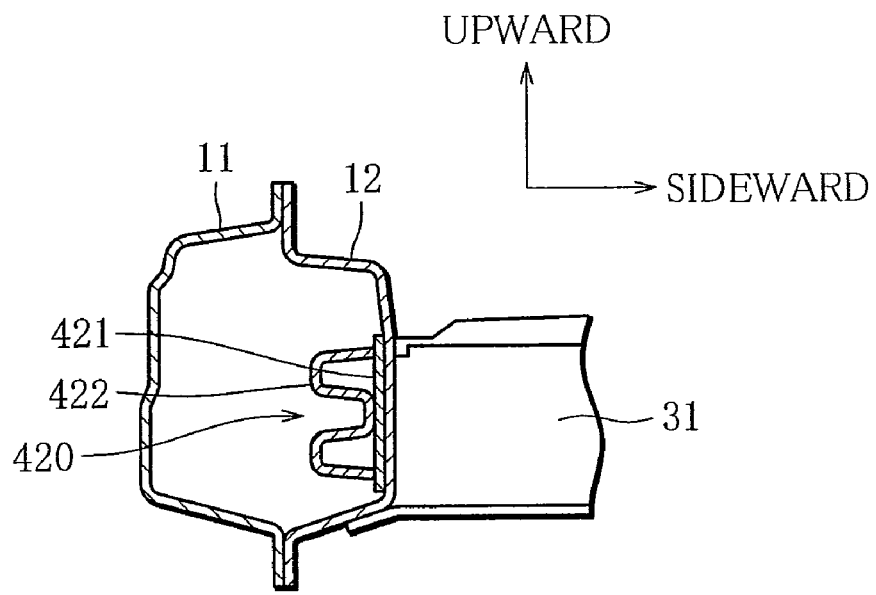
FIG. 11 is a cross-section of a side sill beam across line A-A of FIG. 2 according to another aspect of the invention.

For example, in the embodiments, the side sill beams 20R and 20L are formed in the closed cross section structure that is concave inwards in the vehicle-width direction as viewed in the vehicle front-rear direction as shown in FIGS. 3 and 4, but there is no limitation. The side sill beams 20R and 20L may have a sectional shape of a substantial trapezoid in which a first side 122 located on an outer side in the vehicle-width direction as viewed in the vehicle front-rear direction is longer than a second side 121 located on an inner side in the vehicle-width direction as shown in FIG. 8, a sectional shape of a substantial square in the vehicle front-rear direction in which a member 221 having a large U cross-section that is open outwards in the vehicle-width direction and a member 222 having a small U cross-section are fitted to each other at open ends thereof so that the open ends face outwards in the vehicle-width direction as shown in FIG. 9, a sectional shape of a substantial square in which a first side 321 located on an inner side in the vehicle-width direction as viewed in the vehicle front-rear direction is longer than a second side 322 located on an outer side in the vehicle-width direction as shown in FIG. 10 or a closed W sectional shape including a W-sectional member 422 that opens inwards in the vehicle-width direction as viewed in the vehicle front-rear direction and a flat plate member 421 blocking an open portion of the W-sectional member 422. The side sill beams 20R and 20L have only to prevent from being crushed with their sufficiently high strength and rigidity.

The airbag ECU 61, or the impact sensor in the airbag ECU 61, is disposed in the substantially front section of the upper part of the floor tunnel 33. The point is that the airbag ECU 61 is offset from the satellite sensors 62R and 62L in the vehicle front-rear direction.

The satellite sensors 62R and 62L are disposed above the welded spots of the side sills 10R and 10L inside the cross-sections of the center pillars 40R and 40L, but the locations of the satellite sensors 62R and 62L are not limited to these.

The construction of the vehicle is not limited to monocoque. Needless to say, if the invention is applied to other vehicle constructions than monocoque, the same effects are still obtained. The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle impact detection system comprising:
    a pair of right and left side sills that form a closed cross section structure, extend in a vehicle front-rear direction, and are arranged parallel with a lower side part of a vehicle body;
    a first cross member whose ends are joined to inner surfaces of the side sills in a vehicle-width direction;
    a second cross member that is arranged behind the first cross member in the vehicle front-rear direction and whose ends are joined to inner surfaces of the side sills in the vehicle-width direction;
    a floor tunnel extending in the vehicle front-rear direction and joined to the first and second cross members in a substantially central section in the vehicle-width direction;
    a load-transmitting member that has a shape like an arch curved outwards in the vehicle width direction, is installed in each of the side sills, and is joined to the corresponding side sill at the inside of the side sill at the first cross member and spaced apart from the second cross member at the inside of the side sill;
    a first impact detection element that is disposed near the joining areas with the side sill and the first and second cross members, and detects an impact from the outside in the vehicle-width direction; and
    a second impact detection element that is disposed in the floor tunnel to be offset from the first impact detection element in the vehicle front-rear direction, and detects an impact from the outside in the vehicle-width direction.

2. The vehicle impact detection system according to claim 1, wherein
    the load-transmitting member has a closed cross section structure in which a first side located on an outer side in the vehicle-width direction as viewed in the vehicle front-rear direction is longer than a second side located on an inner side in the vehicle-width direction.

3. The vehicle impact detection system according to claim 2, wherein
    the load-transmitting member includes a member having a hat-like cross section that is open outwards in the vehicle-width direction as viewed in the vehicle front-rear direction and a plate-like member, and has a closed cross section structure in which a pair of flanges of the member having a hat-like cross section and the plate-like member are joined to each other.

4. The vehicle impact detection system according to claim 1, wherein
    on an outer side of each of the side sills in the vehicle-width direction, there is provided an air dam that is open inwards in the vehicle-width direction, extends in the vehicle front-rear direction, and is joined to the corresponding side sill to form a closed cross section structure; and
    a foam material is filled in an internal space of the air dam having the closed cross section structure to fit the arch-shaped portion of the load-transmitting member so as to contact at least an inner surface of the air dam side wall in the vehicle-width direction and an outer surface of a side wall of the corresponding side sill.

5. The vehicle impact detection system according to claim 1, wherein the load-transmitting member is directly attached to the inside of the side sill at a position corresponding to the first cross member joining area.

6. The vehicle impact detection system according to claim 1, further comprising:
    a bulk-head installed in each of the side sills, and the bulk-head is joined directly to the to the corresponding side sill from the inside of the side sill at a position corresponding to the second cross member joining area, and wherein
    the load-transmitting member is attached to the side sill at the position corresponding to the second cross member joining area via the bulk-head.

7. The vehicle impact detection system according to claim 4, wherein the load-transmitting member makes contact with the inside of the side wall of the side sill at a position corresponding to where the foam material makes contact with the outer surface of the outer side wall of the corresponding side sill.

8. The vehicle impact detection system according to claim 7, wherein the load-transmitting member makes contact with the inside of the outer side wall of the side sill at a position between the first and second cross member joining areas in the vehicle front-rear direction.

* * * * *